US012770179B2

(12) United States Patent
Sheng et al.

(10) Patent No.: US 12,770,179 B2
(45) **Date of Patent: *Oct. 20, 2026**

(54) METHOD, COMPUTER PROGRAM PRODUCT, AND SYSTEM FOR SELECTING AN ITEM FOR INCLUSION IN AN ORDER FROM A USER OF AN ONLINE CONCIERGE

(71) Applicant: Maplebear Inc., San Francisco, CA (US)

(72) Inventors: Weian Sheng, Foster City, CA (US); Peng Qi, Menlo Park, CA (US); Changyao Chen, New York, NY (US)

(73) Assignee: Maplebear Inc., San Francisco, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 18/657,781

(22) Filed: May 8, 2024

(65) Prior Publication Data

US 2024/0289866 A1 Aug. 29, 2024

Related U.S. Application Data

(63) Continuation of application No. 17/308,993, filed on May 5, 2021, now Pat. No. 11,995,700.

(51) Int. Cl.

*G06Q 30/0601* (2023.01)
*G06N 5/04* (2023.01)
*G06N 20/00* (2019.01)

(52) U.S. Cl.

CPC ........... *G06Q 30/0631* (2013.01); *G06N 5/04* (2013.01); *G06N 20/00* (2019.01); *G06Q 30/0633* (2013.01); *G06Q 30/0641* (2013.01)

(58) Field of Classification Search

CPC ......... G06Q 30/0631; G06Q 30/06311; G06Q 30/06312; G06Q 30/0633;

(Continued)

(56) References Cited

U.S. PATENT DOCUMENTS 10,242,336 B1 * 3/2019 Agarwal .............. G06Q 10/083
11,436,632 B2 9/2022 Hiremath et al.

(Continued)

OTHER PUBLICATIONS

Google Product Category: How to Get It Right Without Going Crazy?, published in DataFeedWatch Blog (2019) (Year: 2019).*

(Continued)

*Primary Examiner* — Ashley D Preston
(74) *Attorney, Agent, or Firm* — Fenwick & West LLP

(57) ABSTRACT

An online concierge system maintains a taxonomy associating one or more specific items offered by a warehouse with a generic item description. When the online concierge system receives a generic item description from a user for inclusion in an order, the online concierge system uses the taxonomy to select a set of items associated with the generic item description. Based on probabilities of the user purchasing various items of the set, the online concierge system selects an item of the set for inclusion in the order For example, the online concierge system selects an item of the set for which the user has a maximum probability of being purchased. Subsequently, the online concierge system displays an interface for the user that is prepopulated with information identifying the selected item of the set.

20 Claims, 5 Drawing Sheets

(58) Field of Classification Search
CPC ....... G06Q 30/06331; G06Q 30/06332; G06Q 30/06431; G06Q 30/06432; G06Q 30/0601–0643; G06Q 30/08; G06N 5/04; G06N 20/00; G06N 5/02; G06N 20/20
USPC ................................................ 705/26.1–27.2
See application file for complete search history.

(56) References Cited

U.S. PATENT DOCUMENTS

| | | | | |
|---|---|---|---|---|
| 11,995,700 | B2 * | 5/2024 | Sheng | G06N 5/04 |
| 2015/0012381 | A1 * | 1/2015 | Lazaro | G06Q 30/0633 705/26.8 |
| 2015/0363866 | A1 | 12/2015 | Depew | |
| 2017/0046773 | A1 | 2/2017 | Hendricks et al. | |
| 2019/0236488 | A1 | 8/2019 | Achan et al. | |
| 2019/0325367 | A1 | 10/2019 | Tovey et al. | |
| 2021/0365977 | A1 * | 11/2021 | Zarakas | G07G 1/0081 |
| 2022/0027915 | A1 * | 1/2022 | Cameron | G06Q 30/0637 |
| 2022/0067571 | A1 | 3/2022 | Lagerling et al. | |
| 2022/0067642 | A1 * | 3/2022 | Barton | G06Q 30/0617 |
| 2022/0180386 | A1 | 6/2022 | Brown et al. | |

OTHER PUBLICATIONS

Aramark Acquires ‘Good Uncle’ On-Demand Food Delivery Service, published in Wireless News (2019) (Year: 2019).*
Wireless News, “Aramark Acquires ‘Good Uncle’ On-Demand Food Delivery Service,” Close-Up Media, Inc., Aug. 12, 2019, 2 pages, Retrieved from the internet <URL:https://dialog.proquest.com/professional/docview/2272055782?accountid= 131444>.

* cited by examiner

METHOD, COMPUTER PROGRAM PRODUCT, AND SYSTEM FOR SELECTING AN ITEM FOR INCLUSION IN AN ORDER FROM A USER OF AN ONLINE CONCIERGE

CROSS REFERENCE TO RELATED APPLICATION

This application is a continuation of U.S. application Ser. No. 17/308,993, filed May 5, 2021, which is incorporated by reference in its entirety.

BACKGROUND

This disclosure relates generally to ordering an item through an online concierge system, and more specifically to selecting an item for inclusion in an order from a generic item description received by the online concierge system.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. In current online concierge systems, the shoppers may be sent to various warehouses with instructions to fulfill orders for items, and the shoppers then find the items included in the user order in a warehouse.

To place an order through a conventional online concierge system, a user often has to navigate through long lists of items offered by a warehouse to identify a specific item to include in the order. Similarly, a user may provide multiple search queries to an online concierge system to identify specific items for the user to include in an order via the online concierge system. When a user frequently places orders through a conventional online concierge system, the user may spend a considerable amount of time navigating through listings of items offered by a warehouse or providing different search terms to the online concierge system to identify specific items for inclusion in an order. This increased time expended selecting items may decrease a frequency with which a user interacts with the online concierge system or a frequency with which the user subsequently places orders via the online concierge system.

Similarly, third party systems may have difficulty importing information to conventional online concierge system. For example, a third party system, such as a website, maintains recipes for access by the user. Such recipes include generic item descriptions, such as "milk" or "flour" as ingredients. This use of generic item descriptions complicates the third party system identifying items to a conventional online concierge system generates orders based on selection of specific items, and a generic item description may encompass multiple specific items. This prevents a user of a conventional online concierge system from leveraging a recipe or other listing of generic item descriptions to automatically generate an order from the recipe or other listing of generic item descriptions.

SUMMARY

An online concierge system obtains a taxonomy of items offered by a warehouse from an item catalog received from the warehouse, with different levels in the taxonomy providing different levels of specificity about items included in the levels. In various embodiments, the taxonomy identifies a generic item description and associates one or more specific items with the generic item identifier. For example, a generic item description identifies "milk," and the taxonomy associates identifiers of different milk items (e.g., milk offered by different brands, milk having one or more different attributes, etc.), with the generic item identifier. Thus, the taxonomy maintains associations between a generic item description and specific items offered by the warehouse marching the generic item description. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a generic item description, while items in higher levels of the hierarchical taxonomy have a fewer number of attributes, corresponding to less specificity in a generic item description. In various embodiments, higher levels in the taxonomy include less detail about items, so greater numbers of items are included in higher levels (e.g., higher levels include a greater number of items satisfying a broader generic item description). Similarly, lower levels in the taxonomy include greater detail about items, so fewer numbers of items are included in the lower levels (e.g., higher levels include a fewer number of items satisfying a more specific generic item description). The taxonomy may be received from a warehouse in various embodiments. In other embodiments, the online concierge system maintains the taxonomy and applies a trained classification module to an item catalog received from a warehouse to include different items in levels of the taxonomy, so application of the trained classification model associates specific items with generic item descriptions corresponding to levels within the taxonomy.

Using the obtained taxonomy associating items with generic item descriptions, the online concierge system simplifies creation of an order by a user of the online concierge system. For example, after receiving a request to create an order from a user, the online concierge system receives a generic item description from the user for inclusion in the order. In various embodiments, the online concierge system compares an input received from the user to stored generic item descriptions in the obtained taxonomy and selects a stored generic item description matching the received input. The online concierge system may determine a similarity of an input received from the user to each stored generic item description and determine a generic item description having a maximum similarity to the input received from the user was received from the user.

The online concierge system retrieves the obtained taxonomy and identifies a set of specific items associated with the generic item description received from the user. In various embodiments, the set of specific items includes each specific item associated with the generic item description by the retrieved taxonomy. The online concierge system may account for prior inclusion of specific items within associated with the generic item description by other users of the online concierge system. For example, the online concierge system identifies a set of specific items associated with the generic item description received from the user that were included in at least a threshold number or a threshold percentage of orders previously received from users (e.g., orders received by the online concierge system within a specific time interval). The online concierge system may account for a location identified by the request to create the order when identifying the set of specific items in some embodiments and identifies specific items associated with the received generic item description that were included in at least at a threshold number or a threshold percentage of previously received orders (e.g., orders received by the online concierge system within a specific time interval) that identified locations within a threshold distance of a location identified by the request to create the order.

The online concierge system leverages the set of items each associated with the received generic item description to simplify creation of the order by the user by selecting an item from the set for inclusion in the order. In some embodiments, the online concierge system retrieves prior orders received from the user (e.g., orders received by the online concierge system from the user within a specific time interval from the user) and selects an item of the set included in a maximum number or in a maximum percentage of the prior orders received from the user. Alternatively, the online concierge system selects an item of the set included in a prior order most recently received by the online concierge system from the user.

In other embodiments, the online concierge system applies a trained purchase model to items of the set. The trained purchase model outputs a probability of the user purchasing an item. The trained purchase model accounts for times when the user previously purchased an item, such as a relative time from a previously received order including the item to a time when the model is applied, as well as attributes of the item (e.g., a type of the item, a quantity or an amount of the item that was previously purchased, a brand of the item). The trained purchase model may include a decay constant that decreases a weighting of purchases of the items over time, so purchases of the item at longer time intervals from the time when the trained purchase model is applied have lower weights than weights of purchases at the item at shorter time intervals from the time when the trained purchase model is applied. Additionally, the trained purchase model accounts for a frequency with which the user purchases an item, which increases a likelihood of the user purchasing an item if the user more frequently purchases the item. Other example factors used by the trained purchase model to determine the likelihood of a user purchasing an item include: a time interval between prior orders including the item received from the user, a frequency with which the item is included in prior orders received from the user, times when orders including the item were previously received from the user, preferences of the user, and any other suitable information. The trained purchase model may be trained using any suitable method or combination of methods (e.g., supervised learning, unsupervised learning, semi-supervised learning, etc.). In some embodiments, the online concierge system applies the trained purchase model to each combination of the user and an item of the set and selects an item of the set having a maximum probability of being purchased by the user. This allows the online concierge system to select an item of the set that the user is most likely to purchase based on prior orders in which items were purchased by the user. In some embodiments, the trained purchase model accounts for a difference between a probability of the user purchasing an item of the set that was included one or more previous orders and a probability of the user purchasing a different item of the set. For example, the online concierge system ranks other items within the set based on differences between a probability of the user purchasing an item within the set and a probability of the user purchasing an item of the set that was previously purchased by the user (e.g., an item that was most recently purchased by the user) so items having smaller differences have higher positions in the ranking. The online concierge system selects an item of the set having at least a threshold position in the ranking. This allows the online concierge system to maximize a probability of the user purchasing an item of the set when an item of the set differing from an item included in a previous order from the user is selected.

To simplify creation of the requested order for the user, the online concierge system generates an interface for the order that includes information identifying the selected item from the set. For example, the interface includes a list of items included in the order that has information identifying the selected item from the set included in the list. When the interface is displayed to the user, the interface indicates that the selected item from the set is included in the order. Hence, the interface automatically displays the selected item from the determined set as included in the order from the generic item description received from the user without the user providing additional inputs to identify a specific item or navigating through additional interfaces to identify a specific item for inclusion in the order. Through the interface, the user may remove the information identifying the selected item from the set to remove the selected item from the user, but without receiving an input from the user to remove the selected item from the order from the user, the selected item remains included in the order from the user. Thus, rather than manually locate and identify a specific item for inclusion in the order, the interface is populated with information identifying a specific item selected by the online concierge system based on a received generic item description received from the user, reducing a number of interfaces for the user to navigate and reducing an amount of information provided by the user to create the order corresponding to the received request.

In various embodiments, the online concierge system receives a list of generic item descriptions from a user and stores the list in association with the user. When receiving a request to create an order from the user, the online concierge system also receives an indication from the user identifying the list of generic item descriptions stored in association with the user. As further described above, the online concierge system retrieves the obtained taxonomy and identifies a set of specific items associated with each generic item description in the list. Also as further described above, the online concierge system selects an item corresponding to each generic item description and generates the order for the user including each of the selected items corresponding to the generic item descriptions in the list without receiving additional user input. This allows the user to specify a list of generic item descriptions that the online concierge system uses to generate an order including specific items from a warehouse, reducing inputs from the user to generate an order by allowing the user to initially specify the list of generic item descriptions and subsequently leverage the list to generate multiple additional orders without searching or selecting items from different warehouses for which individual orders are created.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
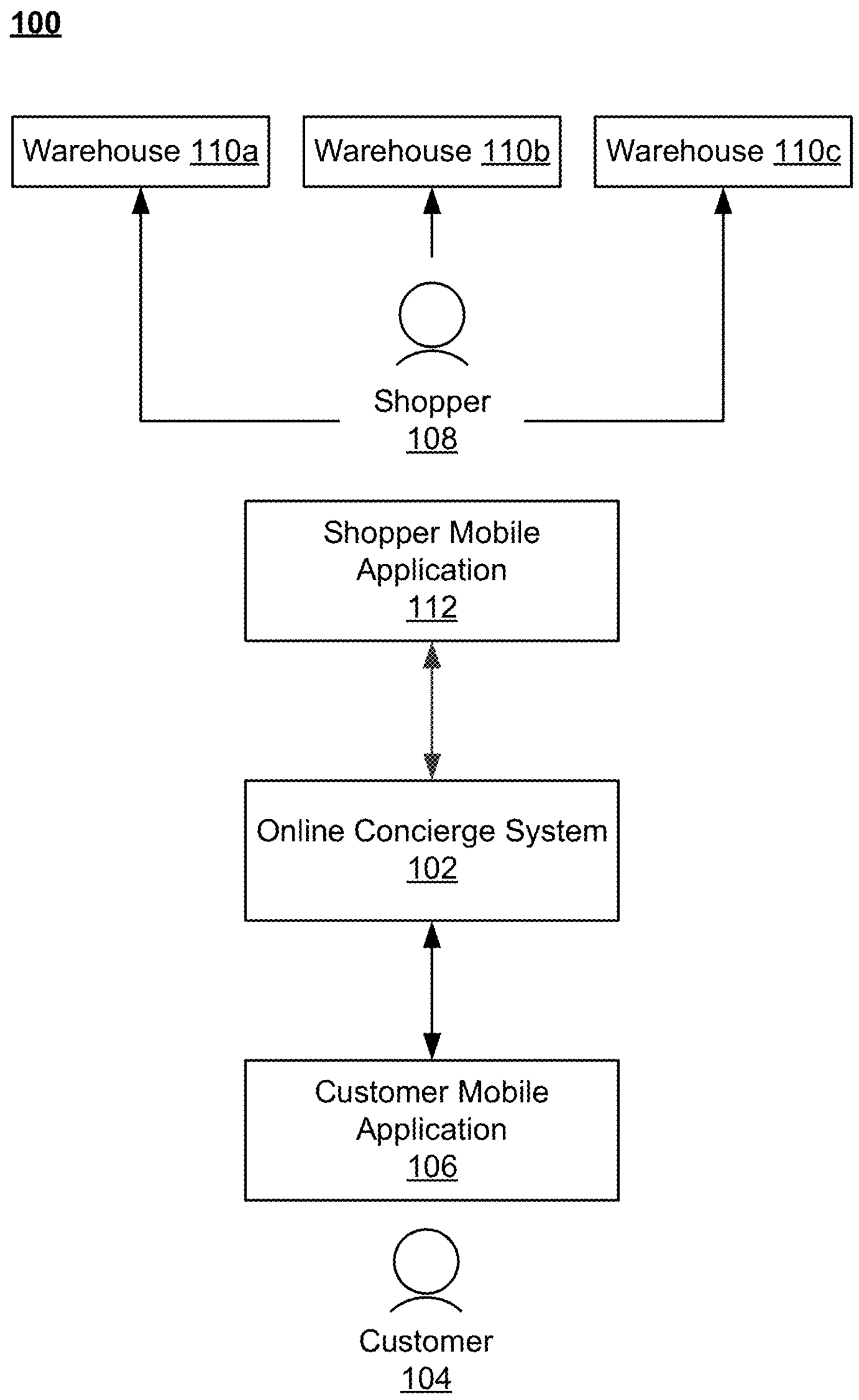
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110*a*, 110*b*, and 110*c* (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
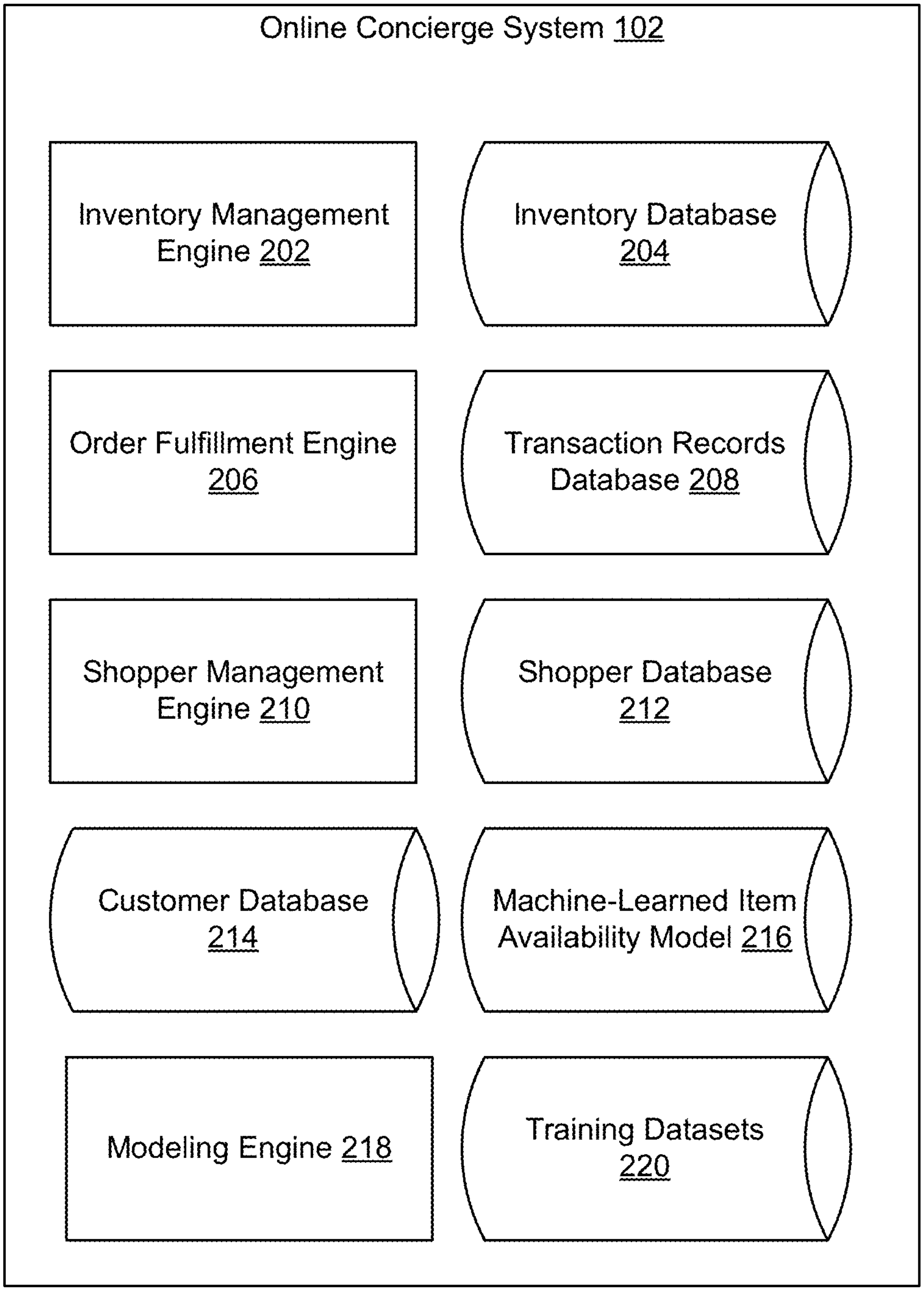
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

In various embodiments, the inventory management engine 202 maintains a taxonomy of items offered for purchase by one or more warehouses 110. For example, the inventory management engine 202 receives an item catalog from a warehouse 110 identifying items offered for purchase by the warehouse 110. From the item catalog, the inventory management engine 202 determines a taxonomy of items offered by the warehouse 110. different levels in the taxonomy providing different levels of specificity about items included in the levels. In various embodiments, the taxonomy identifies a generic item description and associates one or more specific items with the generic item identifier. For example, a generic item description identifies "milk," and the taxonomy associates identifiers of different milk items (e.g., milk offered by different brands, milk having one or more different attributes, etc.), with the generic item identifier. Thus, the taxonomy maintains associations between a generic item description and specific items offered by the warehouse 110 marching the generic item description. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a generic item description, while items in higher levels of the hierarchical taxonomy have a fewer number of attributes, corresponding to less specificity in a generic item description. In various embodiments, higher levels in the taxonomy include less detail about items, so greater numbers of items are included in higher levels (e.g., higher levels include a greater number of items satisfying a broader generic item description). Similarly, lower levels in the taxonomy include greater detail about items, so fewer numbers of items are included in the lower levels (e.g., higher levels include a fewer number of items satisfying a more specific generic item description). The taxonomy may be received from a warehouse 110 in various embodiments. In other embodiments, the inventory management engine 202 applies a trained classification module to an item catalog received from a warehouse 110 to include different items in levels of the taxonomy, so application of the trained classification model associates specific items with generic item descriptions corresponding to levels within the taxonomy. An example taxonomy is further described in U.S. patent application Ser. No. 17/191,134, which is incorporated by reference herein in its entirety.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

In various embodiments, the order fulfillment engine 206 leverages a taxonomy of items maintained by the inventory management engine 202 to simplify order creation for a user. In various embodiments, the order fulfillment engine 206 receives a generic item description for inclusion in an order from a user and selects a generic item description from a taxonomy maintained for a warehouse 110 identified by the order, as further described below in conjunction with FIGS. 4 and 5. From the taxonomy, the order fulfillment engine 206 selects a set of items associated with the received generic item description. As further described below in conjunction with FIGS. 4 and 5, the order fulfillment engine 206 selects an item from the set of items based on one or more criteria. For example, the order fulfillment engine 206 applies a trained purchase model to each item of the set, determining a probability of the user purchasing each item of the set. Based on the determined probabilities, the order fulfillment engine 206 selects an item from the set. The order fulfillment engine 206 generates an interface for display to the user, such as through the customer mobile application 106 that is populated with information identifying the selected item, simplifying inclusion of an item in the order by allowing information identifying the order to include a generic description of an item, from which the order fulfillment engine 206 selects a specific item for inclusion in the order. This simplifies input provided by the user to create an order.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 maintains a trained purchase model that outputs a probability of the user purchasing an item. The trained purchase model accounts for times when the user previously purchased an item, such as a relative time from a previously received order including the item to a time when the model is applied, as well as attributes of the item (e.g., a type of the item, a quantity or an amount of the item that was previously purchased, a brand of the item). The trained purchase model may include a decay constant that decreases a weighting of purchases of the items over time, so purchases of the item at longer time intervals from the time when the trained purchase model is applied have lower weights than weights of purchases at the item at shorter time intervals from the time when the trained purchase model is applied. Additionally, the trained purchase model accounts for a frequency with which the user purchases an item, which increases a likelihood of the user purchasing an item if the user more frequently purchases the item. Other example factors used by the trained purchase model to determine the likelihood of a user purchasing an item include: a time interval between prior orders including the item received from the user, a frequency with which the item is included in prior orders received from the user, times when orders including the item were previously received from the user, preferences of the user, and any other suitable information. The trained purchase model may be trained using any suitable method or combination of methods (e.g., supervised learning, unsupervised learning, semi-supervised learning, etc.).

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
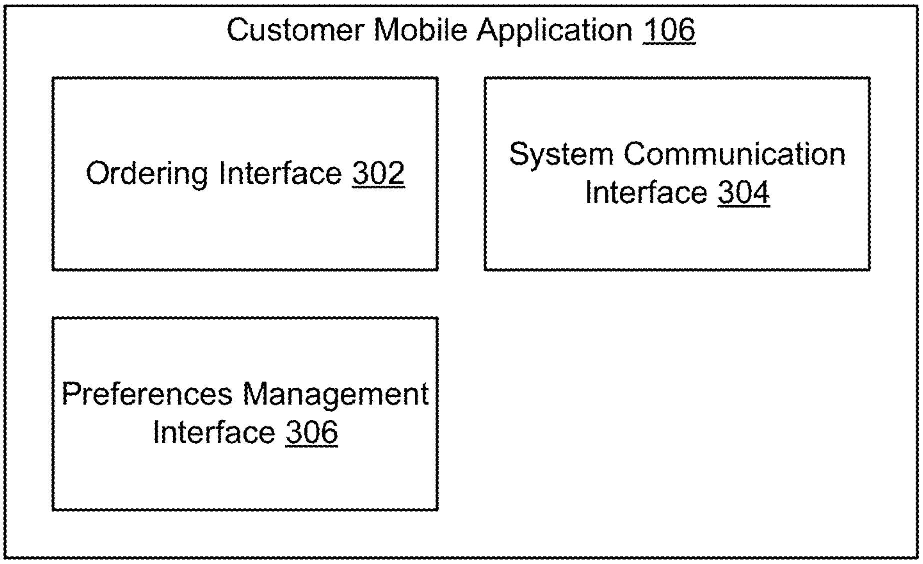
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
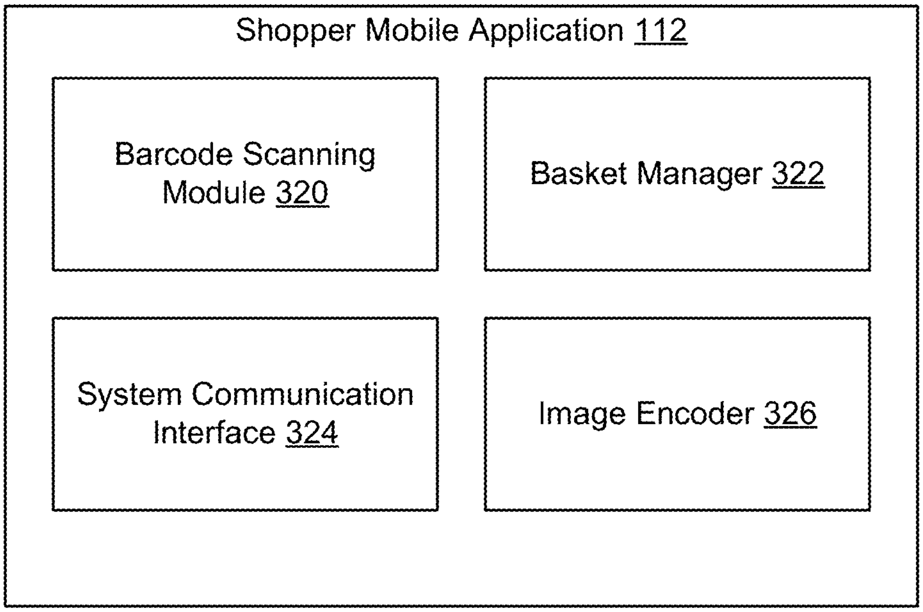
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image.

For example, the image encoder 326 may encode a basket of goods (with an identification of each item) into a QR code which can then be scanned by an employee of the warehouse 110 at check-out.

Selecting an Item for an Order from a Generic Item Description from a User

Figure 4:
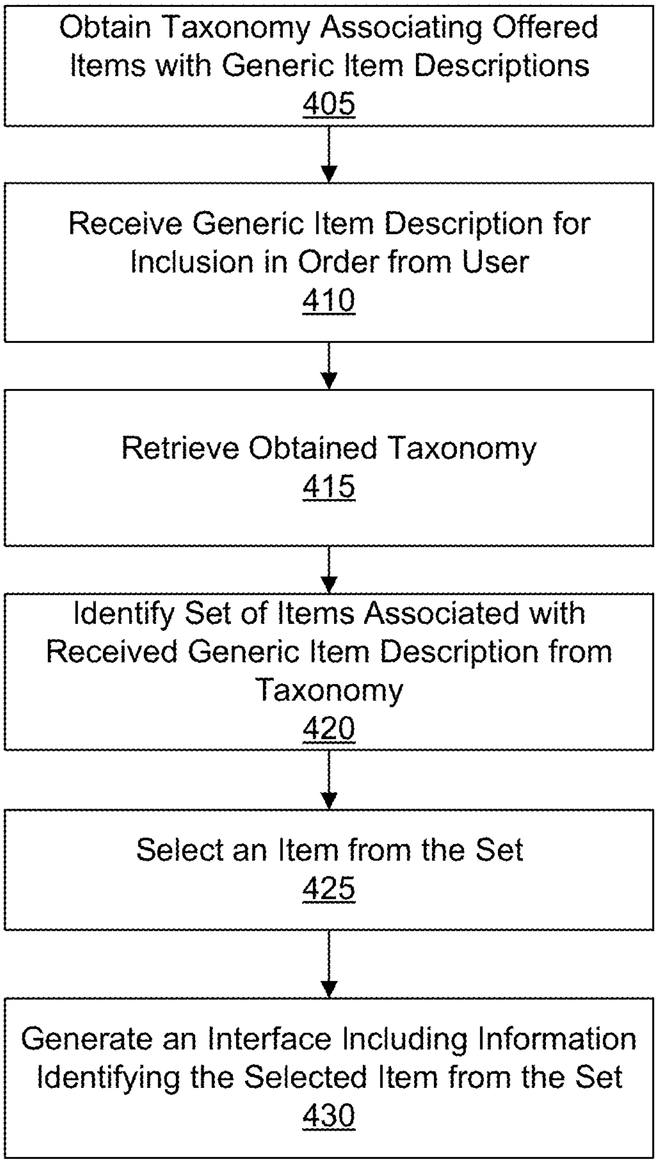
FIG. 4 is a flowchart of a method for an online concierge system selecting an item for inclusion in an order from a generic item description received from a user, according to one embodiment.

FIG. 4 is a flowchart of one embodiment of a method for an online concierge system 102 selecting an item for inclusion in an order from a generic item description received from a user. In various embodiments, the method includes different or additional steps than those described in conjunction with FIG. 4. Further, in some embodiments, the steps of the method may be performed in different orders than the order described in conjunction with FIG. 4. The method described in conjunction with FIG. 4 may be carried out by the online concierge system 102 in various embodiments.

The online concierge system 102 obtains 405 a taxonomy of items offered by a warehouse 110 from an item catalog received from the warehouse 110, with different levels in the taxonomy providing different levels of specificity about items included in the levels. In various embodiments, the taxonomy identifies a generic item description and associates one or more specific items with the generic item identifier. For example, a generic item description identifies "milk," and the taxonomy associates identifiers of different milk items (e.g., milk offered by different brands, milk having one or more different attributes, etc.), with the generic item identifier. Thus, the taxonomy maintains associations between a generic item description and specific items offered by the warehouse 110 marching the generic item description. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a generic item description, while items in higher levels of the hierarchical taxonomy have a fewer number of attributes, corresponding to less specificity in a generic item description. In various embodiments, higher levels in the taxonomy include less detail about items, so greater numbers of items are included in higher levels (e.g., higher levels include a greater number of items satisfying a broader generic item description). Similarly, lower levels in the taxonomy include greater detail about items, so fewer numbers of items are included in the lower levels (e.g., higher levels include a fewer number of items satisfying a more specific generic item description). The taxonomy may be received from a warehouse 110 in various embodiments. In other embodiments, the online concierge system 102 maintains the taxonomy and applies a trained classification module to an item catalog received from a warehouse 110 to include different items in levels of the taxonomy, so application of the trained classification model associates specific items with generic item descriptions corresponding to levels within the taxonomy.

Using the obtained taxonomy associating items with generic item descriptions, the online concierge system 102 simplifies creation of an order by a user of the online concierge system 102. For example, after receiving a request to create an order from a user, the online concierge system 102 receives a generic item description from the user for inclusion in the order. In various embodiments, the online concierge system 102 compares an input received from the user to stored generic item descriptions in the obtained taxonomy and selects a stored generic item description matching the received input. The online concierge system 102 may determine a similarity of an input received from the user to each stored generic item description and determine a generic item description having a maximum similarity to the input received from the user was received 410 from the user.

The online concierge system 102 retrieves 415 the obtained taxonomy, which is stored by the online concierge system 102. In some embodiments, the online concierge system 102 stores different taxonomies that each correspond to a specific warehouse 110 and retrieves 415 a taxonomy stored by the online concierge system 102 corresponding to a warehouse 110 identified by the request to create the order from the user. From the retrieved taxonomy, the online concierge system 102 identifies 420 a set of specific items associated with the generic item description received 410 from the user. In various embodiments, the set of specific items includes each specific item associated with the generic item description by the retrieved taxonomy. The online concierge system 102 may account for prior inclusion of specific items within associated with the generic item description by other users of the online concierge system 102. For example, the online concierge system 102 identifies 420 a set of specific items associated with the generic item description received 410 from the user that were included in at least a threshold number or a threshold percentage of orders previously received from users (e.g., orders received by the online concierge system 102 within a specific time interval). The online concierge system 102 may account for a location identified by the request to create the order when identifying 420 the set of specific items in some embodiments and identifies 420 specific items associated with the received generic item description that were included in at least at a threshold number or a threshold percentage of previously received orders (e.g., orders received by the online concierge system 102 within a specific time interval) that identified locations within a threshold distance of a location identified by the request to create the order.

The online concierge system 102 leverages the set of items each associated with the received generic item description to simplify creation of the order by the user by selecting 425 an item from the set for inclusion in the order. In some embodiments, the online concierge system 102 retrieves prior orders received from the user (e.g., orders received by the online concierge system 102 from the user within a specific time interval from the user) and selects 425 an item of the set included in a maximum number or in a maximum percentage of the prior orders received from the user. Alternatively, the online concierge system 102 selects 425 an item of the set included in a prior order most recently received by the online concierge system 102 from the user.

In other embodiments, the online concierge system 102 applies a trained purchase model to items of the set. The trained purchase model outputs a probability of the user purchasing an item. The trained purchase model accounts for times when the user previously purchased an item, such as a relative time from a previously received order including the item to a time when the model is applied, as well as attributes of the item (e.g., a type of the item, a quantity or an amount of the item that was previously purchased, a brand of the item). The trained purchase model may include a decay constant that decreases a weighting of purchases of the items over time, so purchases of the item at longer time intervals from the time when the trained purchase model is applied have lower weights than weights of purchases at the item at shorter time intervals from the time when the trained purchase model is applied. Additionally, the trained purchase model accounts for a frequency with which the user purchases an item, which increases a likelihood of the user purchasing an item if the user more frequently purchases the item. Other example factors used by the trained purchase model to determine the likelihood of a user purchasing an item include: a time interval between prior orders including the item received from the user, a frequency with which the item is included in prior orders received from the user, times when orders including the item were previously received from the user, preferences of the user, and any other suitable information. The trained purchase model may be trained using any suitable method or combination of methods (e.g., supervised learning, unsupervised learning, semi-supervised learning, etc.). In some embodiments, the online concierge system 102 applies the trained purchase model to each combination of the user and an item of the set and selects 440 an item of the set having a maximum probability of being purchased by the user. This allows the online concierge system 102 to select 425 an item of the set that the user is most likely to purchase based on prior orders in which items were purchased by the user. In some embodiments, the trained purchase model accounts for a difference between a probability of the user purchasing an item of the set that was included one or more previous orders and a probability of the user purchasing a different item of the set. For example, the online concierge system 102 ranks other items within the set based on differences between a probability of the user purchasing an item within the set and a probability of the user purchasing an item of the set that was previously purchased by the user (e.g., an item that was most recently purchased by the user) so items having smaller differences have higher positions in the ranking. The online concierge system 102 selects 425 an item of the set having at least a threshold position in the ranking. This allows the online concierge system 102 to maximize a probability of the user purchasing an item of the set when an item of the set differing from an item included in a previous order from the user is selected 425.

The online concierge system 102 applies the machine-learned item availability model 216, further described above in conjunction with FIG. 2 to the items of the set and a warehouse 110 identified by the request to create the order, determining a predicted availability of different items of the at the warehouse 110 identified for fulfilling the order. In various embodiments, the online concierge system 102 identifies a group of items of the set having at least a threshold availability and ranks the items of the group based on probabilities of the user purchasing each item of the group; the online concierge system 102 selects 425 an item of the group having at least a threshold probability of being purchased by the user or having at least a threshold position (e.g., a maximum position) in the ranking based on their probabilities or being purchased by the user. In another embodiment, the online concierge system 102 ranks items of the set based on their predicted availabilities and identifies a group of items of the set having at least a threshold position in the ranking; the online concierge system 102 selects 425 an item of the group having a maximum probability of being purchased by the user. Alternatively, the online concierge system 102 retrieves information stored in association with an item of the set previously purchased by the user and selects 440 a replacement item stored in association with the user for the identified item. The online concierge system 102 may account for probabilities of the user purchasing various replacement items of the set if multiple replacement items of the set for an item of the set previously purchased by the user are stored in association with the user (e.g., by selecting 425 a replacement item of the set having a maximum probability of being purchased by the user).

In some embodiments, an entity associated with an item in the set provides the online concierge system 102 with compensation for selecting 425 the item from the set. Example entities associated with an item include a warehouse 110 from which the item is obtained, a manufacturer of the item, a brand offering the item, or any other suitable entity. The online concierge system 102 receives compensation from the entity for selecting 425 the item in some embodiments. Alternatively, the online concierge system 102 receives compensation from the entity for the user completing an order and purchasing the item. The online concierge system 102 may account for compensation received from one or more entities when selecting 425 an item of the set. For example, the online concierge system 102 determines expected values for various items of the set for which the online concierge system 102 receives compensation as a product of an amount of compensation received for selecting 425 an item and a probability of the user purchasing the item. The online concierge system 102 selects 425 an item of the set having a maximum expected value or ranks items of the set by their corresponding expected values and selects 425 an item having at least a threshold position in the ranking (e.g., having a maximum position in the ranking). In some embodiments, the online concierge system 102 converts a probability of the user purchasing an item and an amount of compensation the online concierge system 102 receives for selecting 425 the item into a common unit of measurement. For example, the online concierge system 102 applies a conversion factor to the probability of the user purchasing an item of the set that converts the probability of the user purchasing the item to an organic amount of compensation. Alternatively, the online concierge system 102 applies a conversion factor to the amount of compensation the online concierge system 102 received for selecting 425 the item of the set to a compensated probability. Converting the amount of compensation received by the online concierge system 102 for selecting the item and the probability of the user purchasing the item into a common unit of measurement allows the online concierge system 102 to calculate a value for each item of the set, both items for which the online concierge system 102 receives compensation for selecting 425 and items for which the online concierge system 102 does not receive compensation for selecting 425. The online concierge system 102 ranks the items of the set based on their corresponding values and selects 425 an item of the set having at least a threshold position in the ranking (e.g., a maximum position in the ranking) or selects 425 an item of the set having a maximum value.

To simplify creation of the requested order for the user, the online concierge system 102 generates 430 an interface for the order that includes information identifying the selected item from the set. For example, the interface includes a list of items included in the order that has information identifying the selected item from the set included in the list. When the interface is displayed to the user, the interface indicates that the selected item from the set is included in the order. Hence, the interface displays the selected item from the determined set as included in the order from the generic item description received 410 from the user without the user providing additional inputs to identify a specific item or navigating through additional interfaces to identify a specific item for inclusion in the order. Through the interface, the user may remove the information identifying the selected item from the set to remove the selected item from the user, but without receiving an input from the user to remove the selected item from the order from the user, the selected item remains included in the order from the user. Thus, rather than manually locate and identify a specific item for inclusion in the order, the interface is prepopulated with information identifying a specific item selected 425 by the online concierge system 102 based on a received generic item description received 410 from the user, reducing a number of interfaces for the user to navigate and reducing an amount of information provided by the user to create the order corresponding to the received request.

Additionally, the method described above in conjunction with FIG. 4 simplifies importation of information from a third party system to the online concierge system 102 by allowing the third party system to provide generic item descriptions to the online concierge system 102, from which the online concierge system 102 selects specific items corresponding to the generic item descriptions. For example, a third party system maintains a listing of ingredients for a recipe as generic item descriptions, and a user of the online concierge system 102 provides the listing of generic item descriptions from the third party system to the online concierge system in conjunction with an identifier of the user and an identifier of a warehouse 110. Using the method described above in conjunction with FIG. 4, the online concierge system 102 selects a specific item corresponding to each of the generic item descriptions for inclusion in an order for the user. This simplifies exchange of information between a third party system and the online concierge system 102 by allowing the third party system to maintain generic item descriptions, rather than identifying specific items, from which the online concierge system 102 selects specific items corresponding to the generic item descriptions when receiving the generic item descriptions.

Further, the online concierge system 102 may receive a list of generic item descriptions from a user and stores the list in association with the user. When receiving a request to create an order from the user, the online concierge system 102 also receives an indication from the user identifying the list of generic item descriptions stored in association with the user. For example, the request to create the order identifies a warehouse 110 for fulfilling the order and an identifier of the list of generic item descriptions associated with the user. As further described above in conjunction with FIG. 4, the online concierge system 102 retrieves the obtained taxonomy and identifies a set of specific items associated with each generic item description in the list. As described above in conjunction with FIG. 4, the online concierge system selects an item corresponding to each generic item description and generates the order for the user including each of the selected items corresponding to the generic item descriptions in the list without receiving additional user input. This allows the user to specify a list of generic item descriptions that the online concierge system 102 uses to generate an order including specific items from a warehouse 110 identified by the user, reducing inputs from the user to generate an order by allowing the user to initially specify the list of generic item descriptions and subsequently leverage the list to generate multiple additional orders without searching or selecting items from different warehouses for which individual orders are created. Thus, a user may maintain a list of generic item descriptions that is used to generate an order including specific items from a warehouse 110 when the user identifies the warehouse 110, rather than have the user manually search and select specific items each time the user requests an order from a warehouse 110, reducing a number of interfaces for a user to navigate between and a number of inputs for a user to provide to generate an order for fulfillment via the online concierge system 102.

Figure 5:
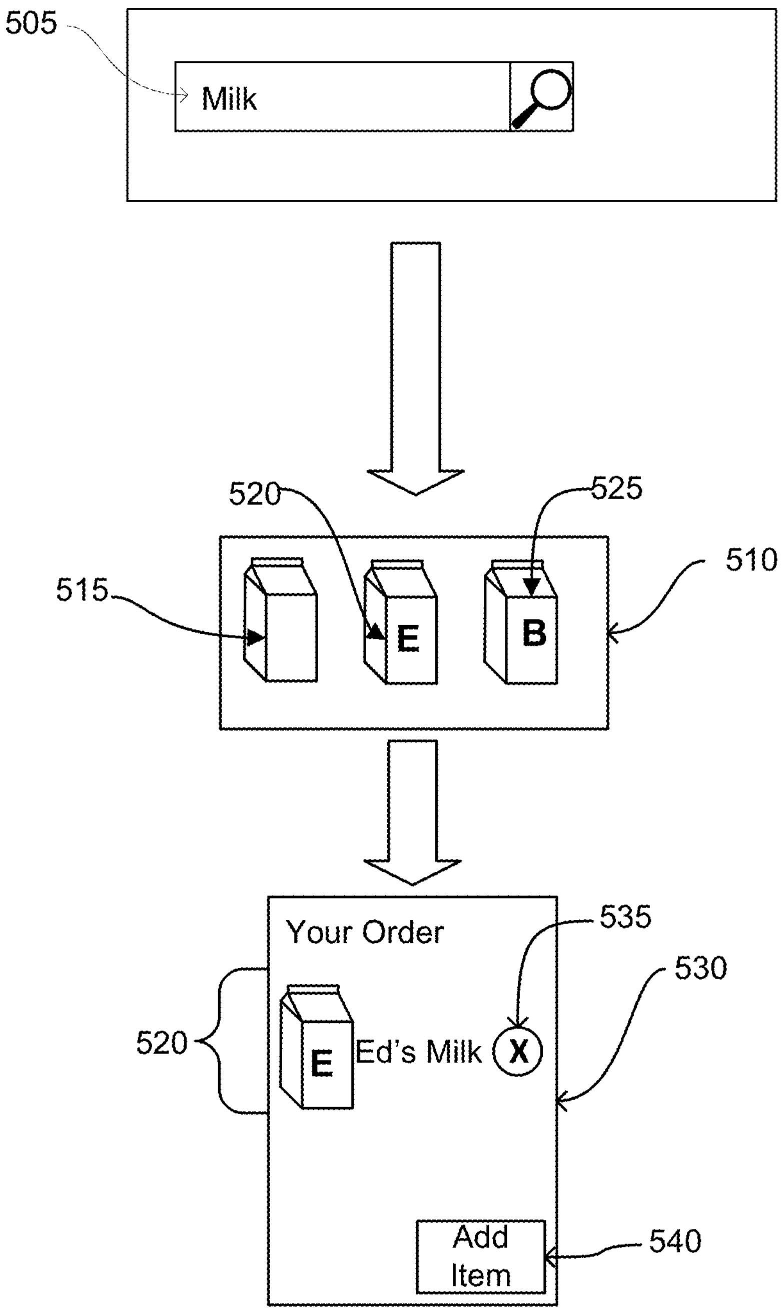
FIG. 5 is a conceptual diagram of a method for an online concierge system selecting an item for inclusion in an order from a generic item description received from a user, in accordance with an embodiment.

FIG. 5 is a conceptual diagram of an online concierge system 102 online concierge system 102 selecting an item for inclusion in an order from a generic item description received from a user. In the example of FIG. 5, the online concierge system 102 receives a generic item description 500 from a user when creating an order. For example, the online concierge system 102 receives the generic item description 500 through an interface presented to the user requests to create an order and after the user identifies a warehouse 110 for fulfilling the order. In other embodiments, the online concierge system 102 receives the generic item description 500 in conjunction with an identifier of a warehouse 110 for fulfilling the order from the user.

As further described above in conjunction with FIGS. 2 and 4, the online concierge system 102 compares the received generic item description 500 to a taxonomy 510 retrieved by the online concierge system 102. The taxonomy 510 maintains associations between different generic item descriptions and different specific items. For example, the taxonomy 510 maintains associations between specific types of milk or specific milk items and a generic item description of "milk." As further described above in conjunction with FIG. 4, the online concierge system 102 compares the received generic item description 500 to generic item descriptions in the taxonomy 510 and selects a generic item description in the taxonomy 510 having a maximum similarity to the received generic item description 500.

From the taxonomy 510, the online concierge system 102 retrieves a set of items associated with the generic item description 500 by the taxonomy 510. In the example of FIG. 5, the online concierge system 102 retrieves items 515, 520, and 525 from the taxonomy 510 as associated with the received generic item description 500. While FIG. 5 shows the taxonomy 510 associating item 515, 520, and 525 with the received generic item description 500, the taxonomy 510 may associate any number of items with the received generic item description 500.

The online concierge system 102 selects one of item 515, 520, and 525 for inclusion in the order for the user, as further described above in conjunction with FIG. 4. As each item 515, 520, 525 is associated with the received generic item description 500 by the taxonomy 510, the online concierge system 102 selects a specific item to include in the order for the user from the generic item description 500 received from the user. For example, the online concierge system 102 selects an item from the taxonomy 510 that was previously included in one or more orders received from the user. However, as further described above in conjunction with FIG. 4, the online concierge system 102 may select one of item 515, 520, and 525 based on one or more criteria. For example, the online concierge system 102 accounts for predicted availability of each item 515, 520, 525 associated with the received item description 500 and may account for a probability of the user purchasing each of item 515, 520, and 525 when selecting an item associated with the received generic item description 500.

In the example of FIG. 5, the online concierge system 102 selects item 520 from the taxonomy 510, using one or more selection criteria further described above in conjunction with FIG. 4. To simplify creation of the order for which the generic item description 500 was received, the online concierge system 102 generates an interface 530 for display to the user that is prepopulated with information describing item 520, which was selected by the online concierge system 102. For example, the interface 530 includes a name and an image of item 520, but may include any suitable information identifying item 520 in various embodiments. The online concierge system 102 automatically includes the information describing item 520 (or whichever item is selected from the taxonomy 510) without receiving input from the user, so the interface 530 includes the information describing the item 520 when initially displayed to the user.

The interface 530 includes additional elements in various embodiments. For example, the interface 530 shown in FIG. 5 includes a removal element 535 that, when selected by the user, removes item 520 from the order. Similarly, the interface 530 includes an addition element 540 that, when selected by the user, prompts the user to enter a search query or other information for selecting another item to include in the order. Hence, selecting item 520 using a taxonomy 510 associating different specific items 515, 520, 525 with a generic item description 500, allows the online concierge system 102 to streamline creation of an order by allowing a user to specify a generic item description 500 that the online concierge system 102 uses along with a taxonomy 510 to select a specific item that is populated into an interface 530 for the order. This reduces an amount of interaction with the online concierge system 102 by the user (e.g., a number of queries provided to the online concierge system 102, a number of interfaces for the user to navigate through) to create an order for fulfillment by the online concierge system 102.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for improving a query engine, the method comprising:

at an online system comprising memory and one or more processors:

receiving a generic item description from a user, the generic item description being a search query inputted into a search field of an interface;

retrieving a taxonomy stored by the online system, the taxonomy maintaining associations between generic item descriptions and attributes of specific items that are associated with serial numbers, the attributes comprising information of stores that offer one or more specific items;

identifying, based on the taxonomy, a set of candidate items that match the generic item description specified in the search field;

traversing one or more paths of the taxonomy from the set of candidate items to identify one or more specific items that are associated with corresponding serial numbers;

selecting the one or more specific items from the set of candidate items, wherein selecting the specific item comprises applying a machine learning model to rank the set of candidate items by availabilities, wherein the machine learning model is trained by:

initiating a set of weights of the machine learning model, receiving a training set that comprises inventory information and past outcomes of delivery orders, comparing an item's availability across multiple warehouses to determine whether the item is chronically unavailable, updating the training set based on the item's availability across multiple warehouses, and adjusting the weights of the machine learning model based on the training set; and causing, responsive to the generic item description being inputted into the search field of the interface, the interface to automatically provide the one or more specific items for display without the user providing additional inputs to identify the specific item, thereby reducing a number of steps the user needs to navigate in the interface to include a specific item.

2. The method of claim 1, wherein selecting, by the online system, the one or more specific item from the set of candidate items comprises:

selecting the specific item that is included in at least a threshold number of orders the online system previously received from the user.

3. The method of claim 1, wherein selecting, by the online system, the one or more specific item from the set of candidate items comprises:

determining a probability of the user purchasing each candidate item in the set of candidate items; and selecting an item having a maximum probability of being purchased by the user from the set.

4. The method of claim 3, wherein determining the probability of the user purchasing each candidate item in the set of candidate items comprises:

applying a trained purchase model to each combination of the user and the candidate item, the trained purchase model being part of the machine learning model, the trained purchase model generating the probability of the user purchasing the candidate item based on attributes of the candidate item and items included in orders the online system previously received from the user.

5. The method of claim 1, wherein selecting, by the online system, the one or more specific item from the set of candidate items comprises:

determining a probability of the user purchasing each candidate item in the set of candidate items;

determining differences between a probability of the user purchasing a candidate item included in one or more previous orders the online system received from the user and probabilities of the user purchasing each alternative item in the set; and selecting an alternative item in the set having a minimum difference between the probability of the user purchasing the candidate item included in one or more previous orders the online system received from the user and the probability of the user purchasing the alternative item in the set.

6. The method of claim 1, wherein selecting, by the online system, the one or more specific item from the set of candidate items comprises:

determining a predicted availability of each candidate item of the set of candidate items at a location;

identifying a group of candidate items of the set having at least a threshold predicted availability; and selecting a candidate item of the group having at least a threshold probability of being purchased by the user.

7. The method of claim 1, wherein selecting, by the online system, the one or more specific item from the set of candidate items comprises:

determining a predicted availability of each candidate item of the set of candidate items at a location;

identifying a group of candidate items of the set having at least a threshold predicted availability;

ranking the candidate items of the group based on probabilities of the user purchasing corresponding items of the group; and selecting a candidate item of the group having at least a threshold position in the ranking.

8. The method of claim 1, wherein selecting, by the online system, the one or more specific item from the set of candidate items comprises:

determining a predicted availability of each candidate item of the set of candidate items at a location;

ranking the candidate items of the set based on their predicted availabilities;

identifying a group of candidate items of the set having at least a threshold position in the ranking; and selecting an item of the group having a maximum probability of being purchased by the user.

9. A computer program product comprising a non-transitory computer readable storage medium having instructions encoded thereon that, when executed by a processor of an online system, cause the processor to:

receive a generic item description from a user, the generic item description being a search query inputted into a search field of an interface;

retrieve a taxonomy stored by the online system, the taxonomy maintaining associations between generic item descriptions and attributes of specific items that are associated with serial numbers, the attributes comprising information of stores that offer one or more specific items;

identify, based on the taxonomy, a set of candidate items that match the generic item description specified in the search field;

traverse one or more paths of the taxonomy from the set of candidate items to identify one or more specific items that are associated with corresponding serial numbers;

select the one or more specific items from the set of candidate items, wherein select the specific item comprises applying a machine learning model to rank the set of candidate items by availabilities, wherein the machine learning model is trained by:

initiating a set of weights of the machine learning model, receiving a training set that comprises inventory information and past outcomes of delivery orders, comparing an item's availability across multiple warehouses to determine whether the item is chronically unavailable, updating the training set based on the item's availability across multiple warehouses, and adjusting the weights of the machine learning model based on the training set; and cause, responsive to the generic item description being inputted into the search field of the interface, the interface to automatically provide the one or more specific items for display without the user providing additional inputs to identify the specific item, thereby reducing a number of steps the user needs to navigate in the interface to include a specific item.

10. The computer program product of claim 9, wherein the instructions to select, by the online system, the one or more specific item from the set of candidate items comprise instructions to:

select the specific item that is included in at least a threshold number of orders the online system previously received from the user.

11. The computer program product of claim 9, wherein the instructions to select, by the online system, the one or more specific item from the set of candidate items comprise instructions to:

determine a probability of the user purchasing each candidate item in the set of candidate items; and select an item having a maximum probability of being purchased by the user from the set.

12. The computer program product of claim 11, wherein the instructions to determine the probability of the user purchasing each candidate item in the set of candidate items comprise instructions to:

apply a trained purchase model to each combination of the user and the candidate item, the trained purchase model being part of the machine learning model, the trained purchase model generating the probability of the user purchasing the candidate item based on attributes of the candidate item and items included in orders the online system previously received from the user.

13. The computer program product of claim 9, wherein the instructions to select, by the online system, the one or more specific item from the set of candidate items comprise instructions to:

determine a probability of the user purchasing each candidate item in the set of candidate items;

determine differences between a probability of the user purchasing a candidate item included in one or more previous orders the online system received from the user and probabilities of the user purchasing each alternative item in the set; and select an alternative item in the set having a minimum difference between the probability of the user purchasing the candidate item included in one or more previous orders the online system received from the user and the probability of the user purchasing the alternative item in the set.

14. The computer program product of claim 9, wherein the instructions to select, by the online system, the one or more specific item from the set of candidate items comprise instructions to:

determine a predicted availability of each candidate item of the set of candidate items at a location;

identify a group of candidate items of the set having at least a threshold predicted availability; and select a candidate item of the group having at least a threshold probability of being purchased by the user.

15. The computer program product of claim 9, wherein the instructions to select, by the online system, the one or more specific item from the set of candidate items comprise instructions to:

determine a predicted availability of each candidate item of the set of candidate items at a location;

identify a group of candidate items of the set having at least a threshold predicted availability;

rank the candidate items of the group based on probabilities of the user purchasing corresponding items of the group; and select a candidate item of the group having at least a threshold position in the ranking.

16. The computer program product of claim 9, wherein the instructions to select, by the online system, the one or more specific item from the set of candidate items comprise instructions to:

determine a predicted availability of each candidate item of the set of candidate items at a location;

rank the candidate items of the set based on their predicted availabilities;

identify a group of candidate items of the set having at least a threshold position in the ranking; and select an item of the group having a maximum probability of being purchased by the user.

17. An online system comprising:

one or more processors; and memory configured to store code comprising instructions, where the instructions, when executed by the one or more processors, cause the one or more processors to:

receive a generic item description from a user, the generic item description being a search query inputted into a search field of an interface;

retrieve a taxonomy stored by the online system, the taxonomy maintaining associations between generic item descriptions and attributes of specific items that are associated with serial numbers, the attributes comprising information of stores that offer one or more specific items;

identify, based on the taxonomy, a set of candidate items that match the generic item description specified in the search field;

traverse one or more paths of the taxonomy from the set of candidate items to identify one or more specific items that are associated with corresponding serial numbers;

select the one or more specific items from the set of candidate items, wherein select the specific item comprises applying a machine learning model to rank the set of candidate items by availabilities, wherein the machine learning model is trained by:

initiating a set of weights of the machine learning model, receiving a training set that comprises inventory information and past outcomes of delivery orders, comparing an item's availability across multiple warehouses to determine whether the item is chronically unavailable, updating the training set based on the item's availability across multiple warehouses, and adjusting the weights of the machine learning model based on the training set; and cause, responsive to the generic item description being inputted into the search field of the interface, the interface to automatically provide the one or more specific items for display without the user providing additional inputs to identify the specific item, thereby reducing a number of steps the user needs to navigate in the interface to include a specific item.

18. The online system of claim 17, wherein the instructions to select, by the online system, the one or more specific item from the set of candidate items comprise instructions to:

select the specific item that is included in at least a threshold number of orders the online system previously received from the user.

19. The online system of claim 17, wherein the instructions to select, by the online system, the one or more specific item from the set of candidate items comprise instructions to:

determine a probability of the user purchasing each candidate item in the set of candidate items; and select an item having a maximum probability of being purchased by the user from the set.

20. The online system of claim 17, wherein the instructions to select, by the online system, the one or more specific item from the set of candidate items comprise instructions to:

determine a probability of the user purchasing each candidate item in the set of candidate items;

determine differences between a probability of the user purchasing a candidate item included in one or more previous orders the online system received from the user and probabilities of the user purchasing each alternative item in the set; and select an alternative item in the set having a minimum difference between the probability of the user purchasing the candidate item included in one or more previous orders the online system received from the user and the probability of the user purchasing the alternative item in the set.

* * * * *